United States Patent
Salter et al.

(10) Patent No.: US 11,059,417 B2
(45) Date of Patent: Jul. 13, 2021

(54) DRIVER MONITOR CAMERA TO CONTROL LIGHTING FEATURES

(71) Applicant: Ford Global Technologies LLC, Dearborn, MI (US)

(72) Inventors: Stuart C. Salter, White Lake, MI (US); Anthony Dwayne Cooprider, Rochester Hills, MI (US); Dave Brian Glickman, Southfield, MI (US); Justin Teems, Saline, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 16/189,525

(22) Filed: Nov. 13, 2018

(65) Prior Publication Data
US 2020/0148098 A1    May 14, 2020

(51) Int. Cl.
*B60Q 1/24* (2006.01)
*B60W 40/105* (2012.01)
*G06F 3/01* (2006.01)
*G06K 9/00* (2006.01)

(52) U.S. Cl.
CPC ........... *B60Q 1/245* (2013.01); *B60W 40/105* (2013.01); *G06F 3/013* (2013.01); *G06K 9/00845* (2013.01)

(58) Field of Classification Search
CPC ...... B60Q 1/245; B60W 40/105; G06F 3/013; G06K 9/00845; F21S 41/00–698; F21S 10/06–066; F21S 45/00
See application file for complete search history.

(56) References Cited

U.S. PATENT DOCUMENTS

| | | | |
|---|---|---|---|
| 4,787,665 A * | 11/1988 | Rich | B60Q 1/05 296/180.1 |
| 6,048,085 A * | 4/2000 | Turner | B60Q 1/245 362/233 |
| 7,156,542 B2 | 1/2007 | Miller et al. | |
| 9,751,454 B2 | 9/2017 | Pierfelice | |
| 9,843,777 B2 * | 12/2017 | Schofield | B60R 11/0247 |

(Continued)

OTHER PUBLICATIONS

Manual. Automotive Adaptive Front-Lighting System Reference Design. Texas Instruments. (Year: 2013).*

(Continued)

*Primary Examiner* — Aniss Chad
*Assistant Examiner* — Chase L Cooley
(74) *Attorney, Agent, or Firm* — David Coppiellie; Carlson, Gaskey & Olds, P.C.

(57) ABSTRACT

A disclosed light activation system includes a movable lighting element movable to adjust a direction of light, an actuator for moving the movable lighting element, a driver detection device and a controller configured to command operation of the actuator for moving the movable lighting element based on a detected direction of sight of the driver. A disclosed method of operating a vehicle lighting system includes monitoring a direction that a driver of a motor vehicle is looking, determining a lighting element within a region corresponding with the direction the driver is looking, and actuating a lighting element within the region based in response to the determined direction that the driver is looking and in response to a secondary condition being fulfilled.

8 Claims, 3 Drawing Sheets

(56) References Cited

U.S. PATENT DOCUMENTS

| | | | |
|---|---|---|---|
| 2009/0016073 A1* | 1/2009 | Higgins-Luthman | ............... B60Q 1/245 362/465 |
| 2010/0014711 A1 | 1/2010 | Camhi et al. | |
| 2014/0097957 A1* | 4/2014 | Breed | ............... G08B 21/0407 340/576 |
| 2014/0265841 A1* | 9/2014 | Baek | ............... B60Q 3/80 315/77 |
| 2015/0266418 A1* | 9/2015 | Salter | ............... H05B 47/105 362/510 |
| 2016/0144781 A1* | 5/2016 | Kleinert | ............... G08B 21/24 701/36 |
| 2016/0152178 A1* | 6/2016 | Peterson | ............... B60Q 3/80 315/77 |
| 2016/0161527 A1 | 6/2016 | Peterson et al. | |
| 2016/0288627 A1 | 10/2016 | Trinh | |
| 2017/0088036 A1 | 3/2017 | Roeckl et al. | |
| 2017/0096098 A1 | 4/2017 | Korthauer et al. | |
| 2017/0182936 A1* | 6/2017 | Kawamata | ............... G08B 21/22 |
| 2018/0099611 A1* | 4/2018 | Sugimoto | ............... B60Q 3/74 |
| 2018/0236928 A1* | 8/2018 | Fritz | ............... B60Q 1/18 |
| 2019/0283664 A1* | 9/2019 | Kang | ............... B60Q 3/82 |
| 2019/0368702 A1* | 12/2019 | Sousa | ............... F21V 21/15 |

OTHER PUBLICATIONS

Grabianowski, E. (Nov. 26, 2007). How Adaptive Headlights Work. Retrieved from https://auto.howstuffworks.com/adaptive-headlight.htm.

Manual. Automotive Adaptive Front-Lighting System Reference Design. Texas Instruments. Retrieved from http://www.ti.com/lit/ug/spruhp3/spruhp3.pdf.

* cited by examiner

DRIVER MONITOR CAMERA TO CONTROL LIGHTING FEATURES

TECHNICAL FIELD

This disclosure relates to a system and method of controlling lighting elements in a motor vehicle based on detected driver viewing direction.

BACKGROUND

Vehicles are increasingly integrating automated functions to aid operation. Cameras are integrated within the vehicle to detect objects and other vehicles. Cameras may also be included within the occupant cabin to monitor a driver.

Vehicle manufacturers are continually working to reduce cost, improve vehicle safety and increase and maintain customer satisfaction with improved features and systems.

SUMMARY

A light activation system according to an exemplary aspect of the present disclosure includes, among other things, a movable lighting element movable to adjust a direction of light, an actuator for moving the movable lighting element, a driver detection device and a controller configured to command operation of the actuator for moving the movable lighting element based on a detected direction of sight of the driver.

In a further non-limiting embodiment of the foregoing lighting system, the movable lighting element is a spotlight directing light in a direction corresponding with the detected direction of sight of the driver.

In a further non-limiting embodiment of any of the foregoing lighting systems, the spotlight includes a first spotlight on one side of the vehicle and a second spotlight on a second side of the vehicle and the controller actuates one or both of the first spotlight and the second spotlight in response to the detected direction of sight of the driver.

In a further non-limiting embodiment of any of the foregoing lighting systems, the controller operates the movable lighting element in response to the vehicle traveling at a speed below a predefined threshold speed.

In a further non-limiting embodiment of any of the foregoing lighting systems, the controller operates the actuator to move the movable lighting element in response to the driver detection device detecting that the driver is looking at a point outside of the motor vehicle.

In a further non-limiting embodiment of any of the foregoing lighting systems, the controller operates the movable lighting element in response to an environment surrounding the vehicle being dark within a predefined threshold.

In a further non-limiting embodiment of any of the foregoing lighting systems, including an operator actuated switch for turning on the movable light element and the controller controls movement of the actuator to move the moveable light element in response to actuation of the switch.

In a further non-limiting embodiment of any of the foregoing lighting systems, the movable lighting element comprises a plurality of spotlights mounted to the motor vehicle.

A light activation system according to another exemplary aspect of the present disclosure includes, among other things, a lighting element associated with a rear seating area of a vehicle, a driver detection device and a controller configured to command operation of the lighting element based on a detected direction of sight of the driver looking into the rear seating area and a determination that the rear seating area is not occupied.

In a further non-limiting embodiment of the foregoing lighting system, the controller is configured to command operation of the lighting element in response to the vehicle moving below a threshold speed.

In a further non-limiting embodiment of any of the foregoing lighting systems, a visor lighting element and wherein the controller is configured to actuate the visor lighting element in response to the driver detection device recognizing that the visor has been moved to a non-stowed position and that it is night.

A method of operating a vehicle lighting system according to another exemplary aspect of the present disclosure includes, among other things, the steps of monitoring a direction that a driver of a motor vehicle is looking, determining a lighting element within a region corresponding with the direction the driver is looking, and actuating a lighting element within the region based in response to the determined direction that the driver is looking and in response to a secondary condition being fulfilled.

In a further non-limiting embodiment of the foregoing method, the region comprises a rear seating area of a motor vehicle and the secondary condition comprises at least one of the vehicle not moving, the rear seating area being empty of occupants or an environment around the vehicle is dark.

In a further non-limiting embodiment of any of the foregoing methods, the region comprises an external area and the lighting element comprises an external movable spotlight that is moved by a corresponding actuator controlled by a controller mounted within the vehicle and that is in communication with a driver detection system, monitoring the direction that the driver is looking and the actuator controls the movement of the external movable spotlight.

In a further non-limiting embodiment of any of the foregoing methods, including moving the external movable spotlight automatically to direct light in a direction corresponding to the direction that the driver is looking.

In a further non-limiting embodiment of any of the foregoing methods, the external movable spotlight comprises several external movable spotlights and the method includes transitioning between different ones of the several external movable spotlights in response to the direction in which the driver is looking outside the motor vehicle.

In a further non-limiting embodiment of any of the foregoing methods, the external movable spotlight comprises several external movable spotlights and the method includes directing all of the several external movable spotlights in the direction in which the driver is looking outside the motor vehicle.

In a further non-limiting embodiment of any of the foregoing methods, the secondary condition includes the vehicle traveling below a predefined speed threshold and that the environment about the vehicle is determined to be dark within a predefined lighting level.

The various features and advantages of this disclosure will become apparent to those skilled in the art from the following detailed description. The drawings that accompany the detailed description can be briefly described as follows.

DETAILED DESCRIPTION

Figure 1:
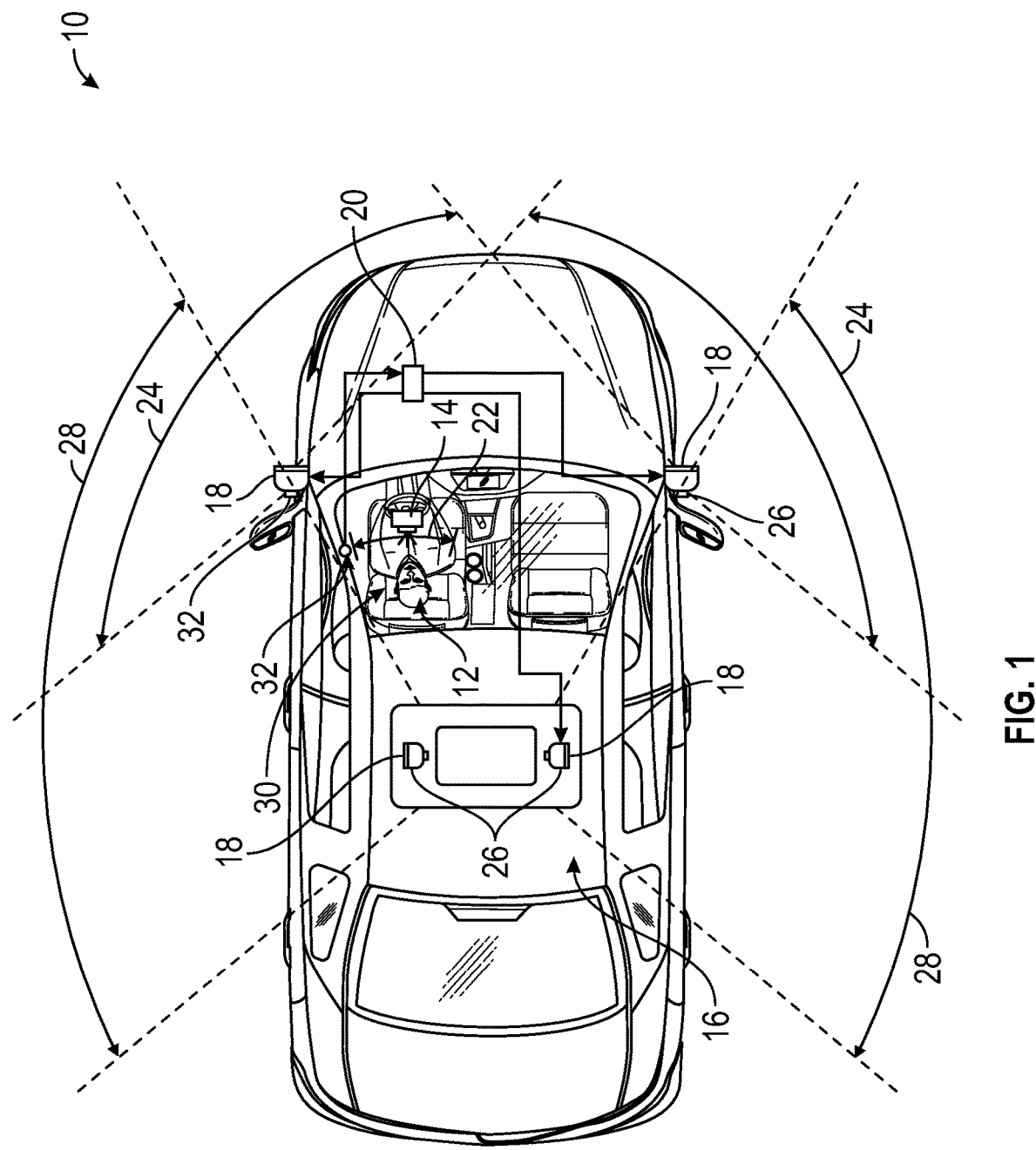
FIG. 1 is a top schematic view of a motor vehicle including an example lighting system embodiment.
Figure 2:
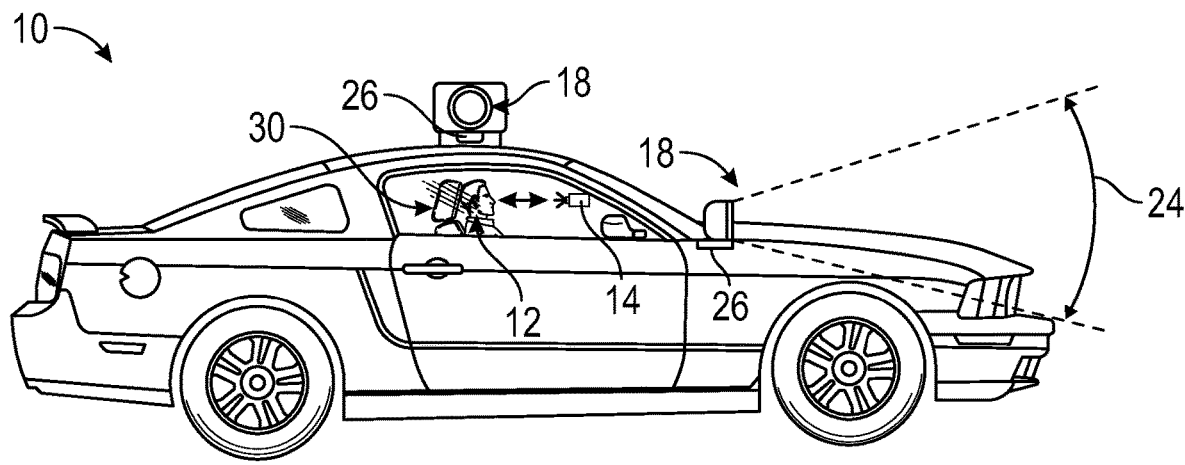
FIG. 2 is a side schematic view of the motor vehicle including the example lighting system embodiment.

Referring to FIGS. 1 and 2, a motor vehicle 10 includes a lighting system 16 that automatically directs light from a moveable lighting element based on a detected viewing direction of a driver 12. The example lighting system 16 includes spotlights 18 mounted at external locations on the vehicle 10. A driver detection device is provided within the vehicle cabin 30. In this example embodiment, the detection device is a camera 14 that is mounted in a location within a location within the vehicle cabin 30 that enables detection of the driver 12 and in what direction the driver is looking.

A controller 20 receives information from the camera 14 indicative of a direction in which the driver 12 is looking. The controller 20 uses this information to adjust the spotlights 18. The controller 20 may direct actuation of one of the spotlights 18, all of the spotlights 18 or some combination of the spotlights 18.

Each of the spotlights 18 include a range of movement schematically indicated by arrows 24 and 28. The range of movement 24, 28 is by way of example and other ranges of movement are also contemplated within the scope of this disclosure. The range of movement 24 can include vertical as well as horizontal movement.

A light controller 32 is provided within the vehicle cabin 30 to activate the spotlights 18. As appreciated, the disclosed lighting system 16 may not always be needed nor desired. In this example, the light controller 32 is a switch activated by the driver 12 or other vehicle occupant.

Figure 3:
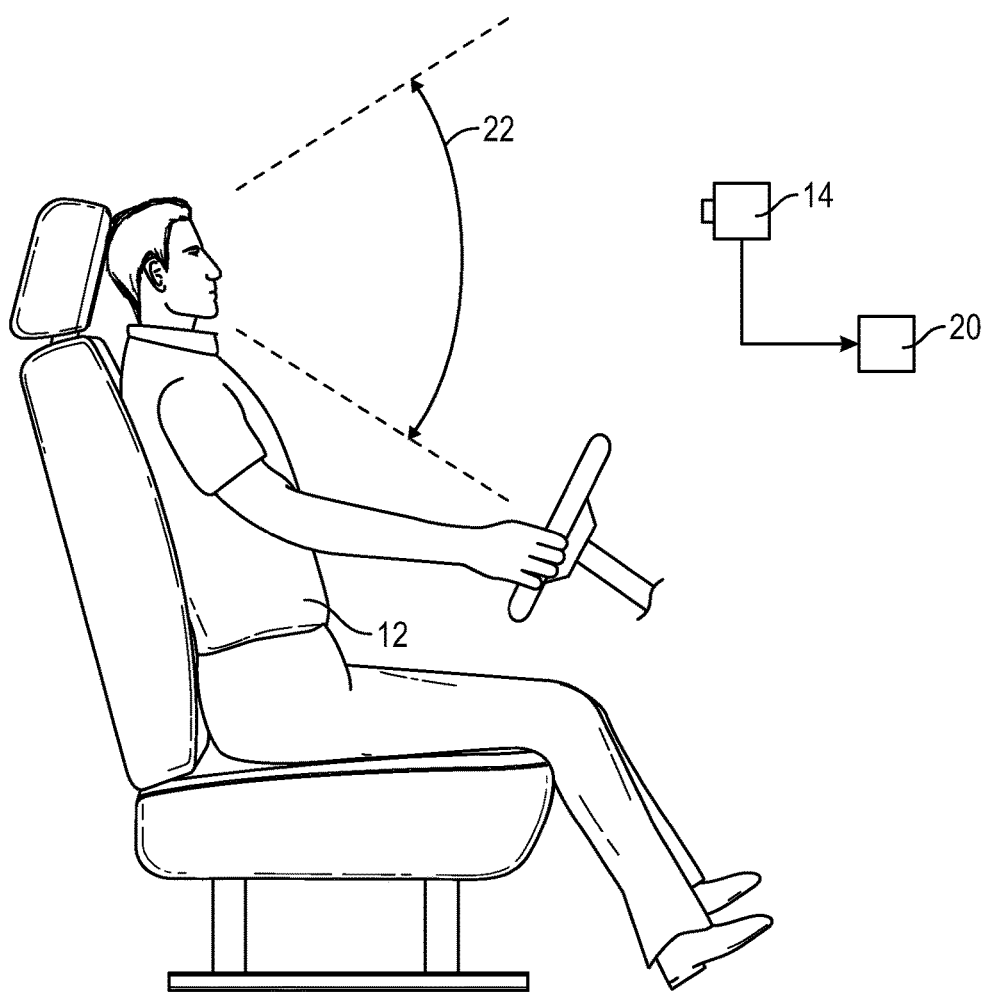
FIG. 3 is a schematic view of a camera for detecting where a driver is looking according to an example embodiment of a discloses lighting system.

Referring to FIG. 3 with continued reference to FIGS. 1 and 2, the driver 12 is monitored by the camera 14. The camera 14 provides images of the driver 12 to the controller 20. The controller 20 interprets the images and determines a direction that the driver 12 is looking. The controller 20 uses this information to determine a direction to direct at least one of the spotlights 18 when the system is activated. The camera 14 will continue to monitor the driver 12 and provide information to the controller 20. The controller 20 continues to determine both the direction that the driver 12 is looking and the direction that the spotlight 18 should be pointed that corresponds with the direction that the driver is looking. In this way, movement of the spotlight 18 corresponds with movement of the driver's sight to illuminate where the driver 12 is looking. Automatically moving the spotlight 18 to match the gaze of the driver 12 allows the driver 12 to maintain both hands on the steering wheel to control the vehicle or perform other tasks.

The example lighting system 16 is suited for use in emergency vehicles such as police vehicles where scanning of dark areas while the vehicle is moving may be useful. The example lighting system 16 enables operation of the external spotlights 18 automatically to aid in searching efforts.

In the disclosed example, the lighting system 16 can be automatic once the activation switch 32 is engaged and a secondary condition is fulfilled. The secondary condition can be conditions that provide for safe operation and also accommodate the lighting conditions around the vehicle. In one disclosed embodiment, the lighting system 16 is not activated when the vehicle is above a predefined speed threshold. As appreciated, effective searching above a predefined speed may not be feasible. Moreover, a driver 12 using the system, particularly in a police application, may need to react to changing conditions such that some predefined parameters would aid the driver 12. In one instance, the controller 20 will turn off the spotlights 18 in response to the vehicle speed exceeding a speed of 10 mph. As appreciated, the predefined speed threshold could be adjusted to accommodate application specific needs. Moreover, the lighting system 16 can be programmed to not actuate the spotlights during the day.

During operation, the example system 16 will monitor the driver 12 and rely images to the controller 20. The example controller 20 can be dedicated to the lighting system 16 or be part of the vehicle controller 20. Moreover, the controller 20 may be implemented as a separate hardware component or be software implemented as part of an overall vehicle controller. The controller 20 continually uses the images provided by the camera 14 to determine a direction in which the driver 12 is looking. The direction can be anywhere within or outside the vehicle 10. The controller 20 uses information about the driver 12 to determine what lighting element to actuate. In this example, the lighting element is the spotlights 18.

Upon actuation of the lighting system 16, the controller 20 determines if secondary conditions are fulfilled. The secondary conditions includes a determination of the light condition around the vehicle 10. The lighting condition instructs the controller 20 if it is day or night. However, in some conditions the time of day is not determinative of the lighting conditions such as for example during a heavy storm or if the vehicle is operating within a partially or fully enclosed parking garage.

The controller 20 will further determine if the vehicle 10 is within a predetermined speed threshold. If the vehicle 10 is stopped or moving at a low speed below the predefined threshold speed, the secondary conditions will be fulfilled and the light system 16 activated. As appreciated, other secondary conditions could be utilized depending on application specific requirements and are within the contemplation and scope of this disclosure.

Once the controller 20 has determined that any secondary condition is fulfilled, the spotlights 18 will be activated. In the disclosed example, several spotlights 18 are disposed on the vehicle 10. In this example, each of the spotlights 18 can be aimed in a direction corresponding with the direction that the driver 12 is looking. Movement of the driver 12 will trigger a corresponding movement of the spotlights 18. The spotlights 18 will sweep through the range of motion 24, 28 to illuminate the direction that the driver 12 is looking.

In another disclosed embodiment, the spotlights 18 transition between each other depending on the direction that the driver 12 is looking. When the driver looks to the left of the vehicle, the left spotlights 18 are active. As the driver sweeps focus to the front of the vehicle, the spotlights move toward the front where spotlights from the right side of the vehicle would be actuated and begin moving based on movement of the driver's gaze. As the driver's gaze sweeps to the right of the vehicle, spotlights 18 on the right side of the vehicle can continue sweeping motion to illuminate the right side of the vehicle. The spotlights on the left side of the vehicle may turnoff or remain at a forward position. Accordingly, different ones of the spotlights 18 can be actuated to follow the gaze of the driver 12. The example lighting system 16 enables sweeping of spotlight illumination without direct driver input to free the driver's attention to other tasks.

Figure 4:
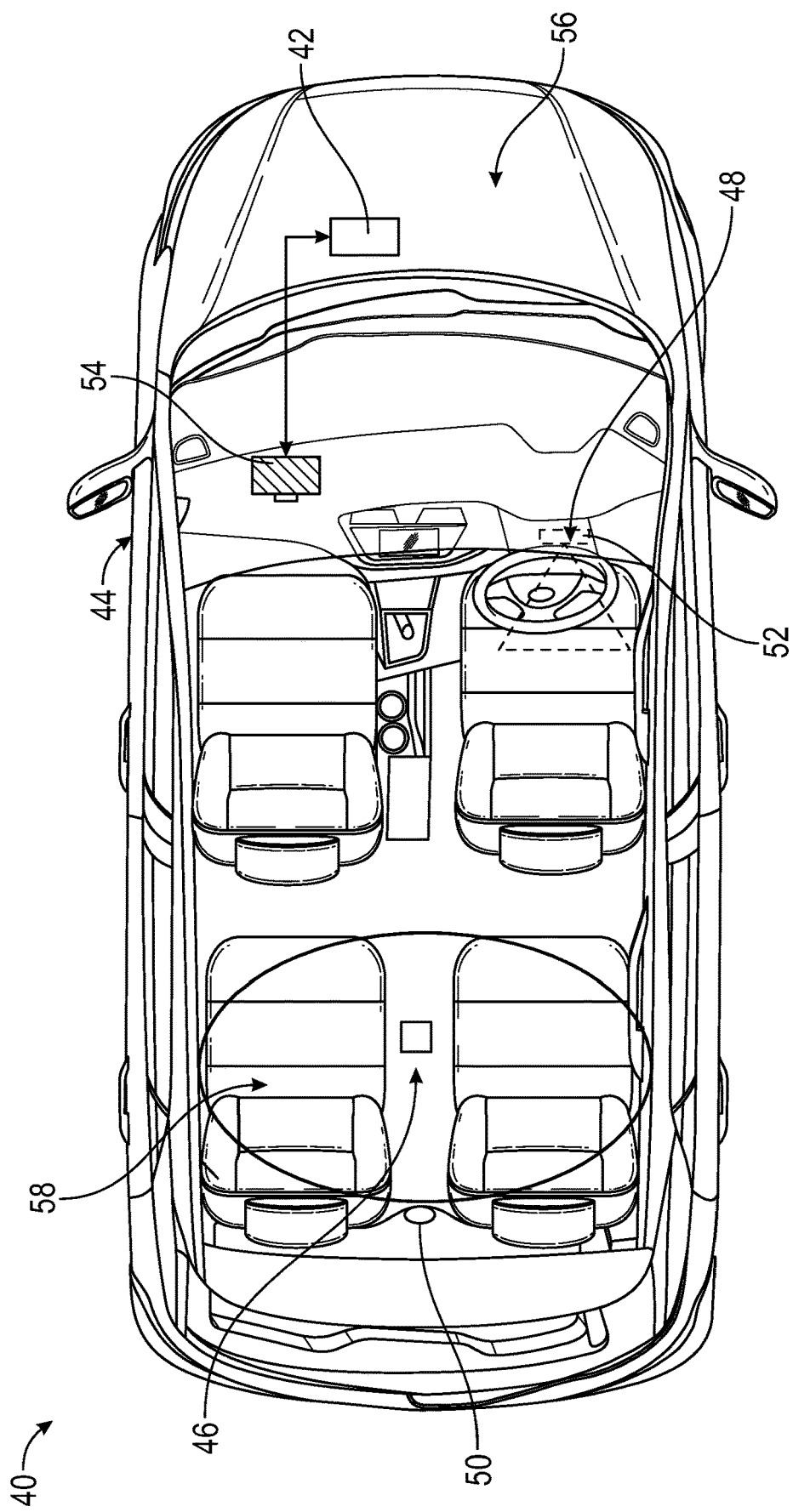
FIG. 4 is a schematic view of a motor vehicle including another example lighting system.

Referring to FIG. 4, a vehicle 40 is schematically shown and includes an automatically operated lighting system 56. The lighting system 56 includes a driver detection device in the form of a camera 54. As appreciated, although a camera 54 is disclosed by way of example, other driver detection devices that are capable of generating information usable to discern a direction in which a driver is looking are also within the contemplation and scope of this disclosure. The camera 54 provides information to a controller 42 that is utilized to automatically actuate lights of the vehicle 40.

The lighting system 56 controls interior lighting features in response to a determination that a driver is looking into a region that corresponds with a lighting feature. The vehicle 40 includes an external spot light 44, a rear cabin light 46 and a visor light 48.

In an example embodiment, the rear seating area 58 is illuminable by a cabin light schematically indicated at 46. The cabin light 46 may be within a ceiling of the rear seating area or be directed lighting disposed in other parts of the vehicle cabin. An occupant sensor 50 is provided proximate the rear seating area 58 to provide information to the controller 20 on the presence of occupants.

The system 56 actuates the cabin light 46 to aid a driver 12 looking into the rear seating area 58. However, the light 46 is only activated upon the fulfillment of secondary conditions. In one example, the secondary conditions can include any one or combination of vehicle speed, presence of someone in the rear seating area 58 and the time of day. If the vehicle is moving, the system 56 may not actuate the light for safety reasons. Moreover, the system 56 may not actuate the cabin light 46 if someone is present in the rear seating area 58 to prevent potential discomfort to passengers.

The system 56 also includes the external spot light 44 that is actuated when a driver looks out the side of the vehicle 40, when the vehicle is stopped.

The system 56 further includes a visor light 48 that is actuated in response to the camera 54 capturing images determined by the controller 20 to indicate that a visor 52 has been moved to a non-stowed position. The visor 52 can be moved by the driver 12 to provide illumination and can be actuated automatically with the example system 56.

Accordingly, the disclosed vehicle lighting systems utilize driver movements to automatically turn on and direct light to aid operation of the motor vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A light activation system for a motor vehicle comprising:
   a lighting element associated with a rear seating area of a vehicle;
   a driver detection device; and
   a controller configured to command operation of the lighting element based on a detected direction of sight of the driver looking into the rear seating area and a determination that the rear seating area is not occupied.

2. The light activation system as recited in claim 1, wherein the controller is configured to command operation of the lighting element in response to the vehicle moving below a threshold speed.

3. The light activation system as recited in claim 1, including a visor lighting element and wherein the controller is configured to actuate the visor lighting element in response to the driver detection device recognizing that the visor has been moved to a non-stowed position and that it is night.

4. A method of operating a vehicle lighting element comprising:
   monitoring a direction that a driver of a motor vehicle is looking;
   determining a lighting element within a region corresponding with the direction the driver is looking, wherein the region comprises a rear seating area of a motor vehicle; and
   actuating a lighting element within the region based in response to the determined direction that the driver is looking and in response to a secondary condition being fulfilled, wherein the secondary condition comprises the rear seating area being empty of occupants.

5. The method as recited in claim 4, wherein the region further includes an external area and an external movable spotlight that is moved by a corresponding actuator controlled by a controller mounted within the vehicle and in communication with a driver detection system monitoring the direction that the driver is looking and the actuator controls the external movable spotlight.

6. The method as recited in claim 5, including moving the external movable spotlight automatically to direct light in a direction corresponding to the direction that the driver is looking.

7. The method as recited in claim 6, wherein the external movable spotlight comprises several external movable spotlights and the method includes transitioning between different ones of the several external movable spotlights in response to the direction in which the driver is looking outside the motor vehicle.

8. The method as recited in claim 6, wherein the external movable spotlight comprises several external movable spotlights and the method includes directing all of the several external movable spotlights in the direction in which the driver is looking outside the motor vehicle.

* * * * *